US011770437B1

(12) United States Patent
Kallampally et al.

(10) Patent No.: US 11,770,437 B1
(45) Date of Patent: Sep. 26, 2023

(54) TECHNIQUES FOR INTEGRATING SERVER-SIDE AND CLIENT-SIDE RENDERED CONTENT

(71) Applicant: Amazon Technologies, Inc., Seattle, WA (US)

(72) Inventors: Arun Karippal Kallampally, Edmonds, WA (US); Xinwei Li, Burnaby (CA); Aditya Kumar Tanti, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/446,410

(22) Filed: Aug. 30, 2021

(51) Int. Cl.

| | |
|---|---|
| ***H04L 67/02*** | (2022.01) |
| ***H04L 67/00*** | (2022.01) |
| ***G06Q 20/12*** | (2012.01) |
| ***G06F 9/451*** | (2018.01) |
| ***G06F 8/60*** | (2018.01) |
| ***G06Q 30/0601*** | (2023.01) |
| *H04L 67/01* | (2022.01) |

(52) U.S. Cl.
CPC ................ *H04L 67/02* (2013.01); *G06F 8/60* (2013.01); *G06F 9/451* (2018.02); *G06Q 20/12* (2013.01); *G06Q 30/0603* (2013.01); *H04L 67/34* (2013.01); *H04L 67/01* (2022.05)

(58) Field of Classification Search
CPC ......... H04L 67/02; H04L 67/34; H04L 67/01; G06F 8/60; G06F 9/451; G06F 16/20; G06F 16/144; G06F 16/156; G06F 16/24; G06F 16/33; G06F 6/95; G06Q 20/12; G06Q 30/0603
See application file for complete search history.

(56) References Cited

U.S. PATENT DOCUMENTS

| | | | | |
|---|---|---|---|---|
| 10,542,040 B2 * | 1/2020 | Beskrovny | ............ | G06F 16/986 |
| 2007/0100844 A1 * | 5/2007 | Buttner | ................. | G06F 16/957 |
| 2007/0101288 A1 * | 5/2007 | Forstall | ................. | G06F 3/0488 715/779 |
| 2008/0082627 A1 * | 4/2008 | Allen | ..................... | G06Q 10/10 709/217 |
| 2008/0235602 A1 * | 9/2008 | Strauss | ................... | G06F 9/451 715/802 |

(Continued)

*Primary Examiner* — Michael Won
(74) *Attorney, Agent, or Firm* — Kilpatrick Townsend & Stockton LLP

(57) ABSTRACT

Techniques are described herein for providing mixed content (e.g., at least one server-side rendered component of a webpage and at least one client-side rendered component of a webpage. A request for the webpage can be transmitted from an application operating at a client device to a server. The server may render some content of the webpage (referred to as server-side rendered (SSR) content). The server may provide the SSR content with executable code (or a location from which the executable code may be obtained) in response to the request. The application may initially hide the SSR content while generating client-side rendered (CSR) content by executing the executable code. After rendering the CSR content, both the SSR content and the CSR content may be presented at substantially the same time at the webpage. The SSR content may be presented by changing the value of an indicator associated with the SSR content.

20 Claims, 13 Drawing Sheets

(56) References Cited

U.S. PATENT DOCUMENTS

| | | | | |
|---|---|---|---|---|
| 2009/0177997 | A1* | 7/2009 | Do | G06F 16/957 715/789 |
| 2010/0313252 | A1* | 12/2010 | Trouw | G06Q 30/0222 715/760 |
| 2011/0154200 | A1* | 6/2011 | Davis | H04N 21/235 715/765 |
| 2012/0110384 | A1* | 5/2012 | Brunet | G06F 40/143 714/37 |
| 2016/0328114 | A1* | 11/2016 | Santhakumar | G06F 9/451 |
| 2017/0185612 | A1* | 6/2017 | Kamadolli | G06F 21/6263 |
| 2018/0101506 | A1* | 4/2018 | Hodaei | G06F 9/451 |
| 2018/0341388 | A1* | 11/2018 | Zheng | G06F 3/04842 |
| 2020/0249963 | A1* | 8/2020 | Yeh | G06F 9/45529 |
| 2022/0121410 | A1* | 4/2022 | Li | G06F 3/14 |

* cited by examiner

800

802

804

```
@Controller
@HorizonteController
public class AddPaymentFlowController {
        ...
        @WebpackAssets(assets = { ... })
        @RequiresHttps
        @RequiresAuthenticatedUser
        @RequestMapping(value = { "/invoicing/preferences/addpayment", "/invoicing/preferences/addpayment/
{paymentInstrumentId}/usage", "/invoicing/preferences/addpayment/{paymentInstrumentId}/ContactInfo" })

        public ModelAndView addPaymentInstrument(@PathVariable (required = false) String paymentInstrumentId, final
HttpServletRequest request, final HttpServletResponse response)
        {
                ...
                final String addPaymentWidget = paymentPortalWidgetClient.continueWidget
                (requestContextHttpServeletDefault(paymentWidgetInput));   ← 806
                {
                        cmav.addObject("addPaymentWidget", addPaymentWidget);  ← 808
                        return cmav;  ← 810
                }
        }
}
```

```
<%@ page contentType="text/x-html-parts" pageEncoding="UTF-8"%>
...
<script type="text/javascript">
...
var eventHandlers =
{
        'WidgetAction': function(widgetActionEventObj){
        P.when('A').execute('abp-process-add-payment', function(A) {
                A.trigger('abp:card:added', widgetActionEventObj);
        });  ← 904

        return PaymentsPortal2.events.STOP_EVENT_PROCESSING;
},

'Fatal': function() { window.location.href = '/500'; },
};

window.PaymentsPortal2Config = {
        onWidgetCreated: [function(widget) {
                for (var event in eventHandlers) {
                        if (eventHandlers.hasOwnProperty(event)) {
                                var handler = eventHandlers[event];
                                widget.on(event, handler);
                        }
                }
        }]
};

</script>
<div id="abp-page-content">

        <div id="react-root"></div>   ← 910

        <wb:injectWebpackBodyAssets />   ← 912

        <div id="abp-page-wrapper" class="aok-hidden">   ← 914
                ${addPaymentWidget}  ← 916
        </div>
</div>
```

902 (brace: `var eventHandlers` … `};`)

906 (brace: `window.PaymentsPortal2Config` … `};`)

908 (brace: `</script>` … `</div>`)

FIG. 9

```
import React from 'react';
...
class PaymentOnboardHomePage extends React.Component {
...
          componentWillMount() { this.addPaymentPageInitialize(); }
1002      componentDidMount() { this.addPaymentWidgetShow(); }
          componentWillUnmount() { this.addPaymentWidgetHide(); }

          render() {
                    return (
                              <div>
                                        <AddPaymentPageLayout
                                        pageIndex={0}
                                        ...
1006                                    hideNavigationBar={false}
                                        hideActionButtonsBar={true}
                                        cancelLink={null}
                                        />
                              </div>
                    );
          };

addPaymentWidgetShow() { P.when('jQuery', 'ready').execute('abp-addpayment-widget-show',
function($) { $('#abp-page-wrapper').show(); }); }

addPaymentWidgetHide() { P.when('jQuery', 'ready').execute('abp-addpayment-widget-hide',
function($) { $('#abp-page-wrapper').remove(); }); }

addPaymentPageInitialize() {
          const history = this.props.history;
          const legGroupId = this.props.groupId;

          P.when('A', 'ready').execute('abp-addpayment-widget-init',          function(A) { var $ = A.$;
1004      function cardAdded(widgetActionEventObj) {
                    if (widgetActionEventObj && widgetActionEventObj.paymentInstrumentId &&
                    widgetActionEventObj.widgetActionType === 'add-payment-instrument')
                    {
                              const url = "/invoicing/preferences/addpayment/" +
                              widgetActionEventObj.paymentInstrumentId + "/
                              usage?groupId=" + legGroupId; history.push(url);
                    }
          }
          A.on('abp:card:added', cardAdded); });
}
```

TECHNIQUES FOR INTEGRATING SERVER-SIDE AND CLIENT-SIDE RENDERED CONTENT

BACKGROUND

Various applications (e.g., web browsers, shopping applications, etc.) have been used for decades to render content at a client device. This was initially performed using server-side rendering techniques. For example, an application would issue a request for a webpage to a web server. The web server, in response to the request, would render the corresponding HTML for the webpage and pass back the fully rendered page to the application for display. This would occur each and every time the user would navigate to a different webpage (if the browser had no cached version of those webpages) and produces some latency as each webpage is fully rendered each time, even if only a small portion of content has changed from one page to the next.

Client-side rendering has emerged in recent years due to the undesirable amount of latency inherent in server-side rendering (e.g., because each page is rendered anew each time). In client-side rendering, the application (e.g., an application operating at the client device such as a web browser or a shopping application configured to access an electronic catalog of items) may receive a barebones version of the webpage from the server with JavaScript that defines some portion of the content of the page (or a location from which JavaScript code that defines the content of the page can be downloaded). The browser executes the JavaScript to render the content at the client device. Some client-side applications can track changes to the webpage using a virtual document object model (DOM) and only re-render the portions of the webpage that have changed. This makes the initial load of a webpage slower when rendered client-side, but each subsequent selection is rendered faster than would be the case if the content was rendered at the server.

However, due to the implementation used by client-side rendering applications, server-side and client-side rendered components are conventionally not combined. One reason for this might be that because the HTML DOM rendered for server-side components is outside the virtual DOM used for client-side rendered components, the client side application would not have control of this HTML. Additionally, if a server-side rendered component was included with the JavaScript for rending the client-side rendered component, the server-side component would appear to the user before the client-side rendered component(s) were fully rendered by the client application. This would create a disjointed experience for the user that can be confusing and frustrating. Embodiments of the invention address these and other problems, individually and collectively.

BRIEF DESCRIPTION OF THE DRAWINGS

Various embodiments in accordance with the present disclosure will be described with reference to the drawings, in which:

FIG. 8 is an example code excerpt illustrating exemplary controller code, in accordance with at least one embodiment;

FIG. 9 is an example code excerpt illustrating exemplary view code, in accordance with at least one embodiment;

FIG. 10 is an example code excerpt illustrating client-side code, in accordance with at least one embodiment;

DETAILED DESCRIPTION

Figure 1:
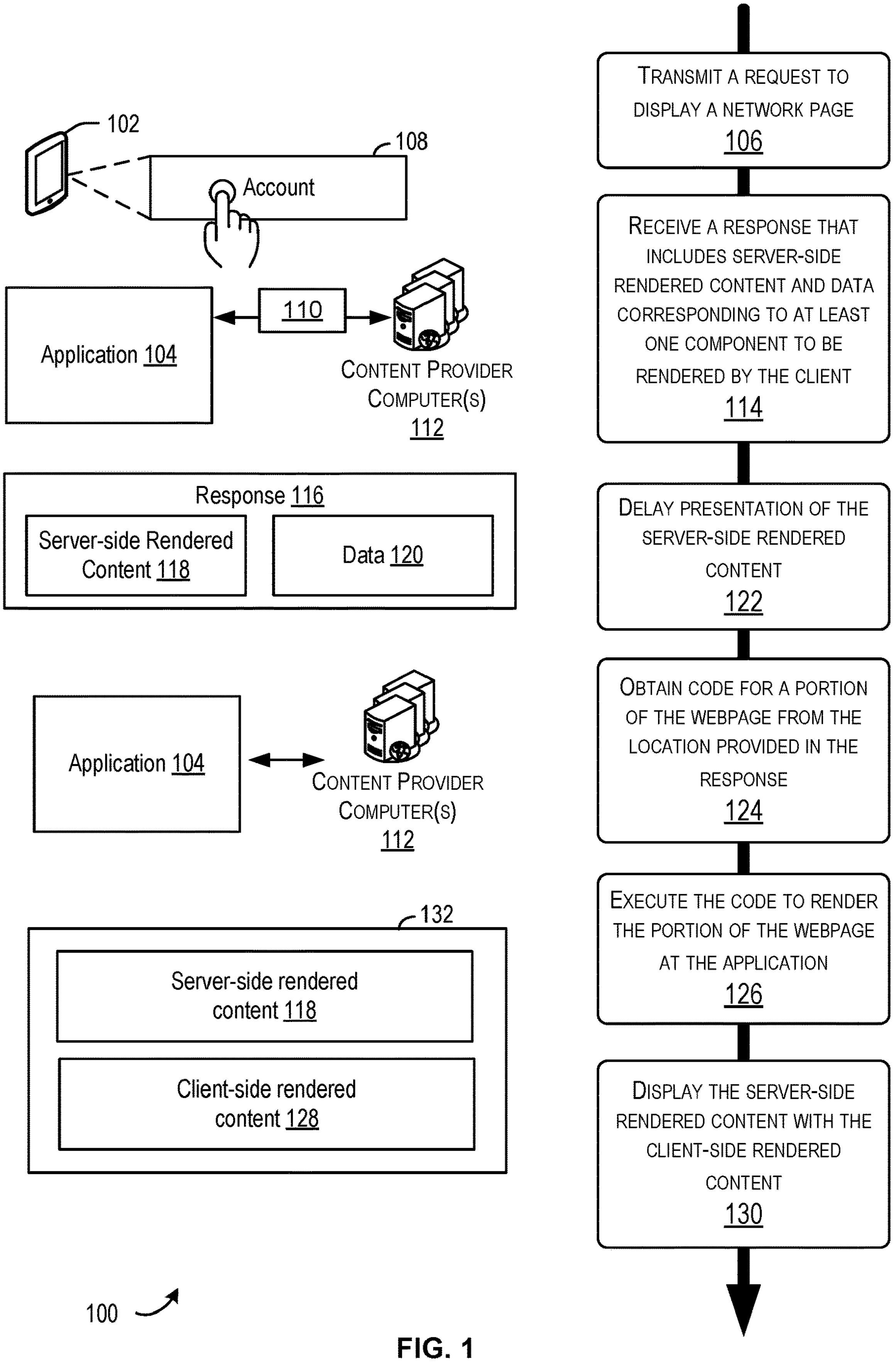
FIG. 1 is an example flow for rendering a webpage that includes mixed content (e.g., at least one server-side rendered component and at least one client-side rendered component), in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to providing a webpage having mixed content (e.g., at least one server-side rendered component and at least one client-side rendered component). Conventionally, a webpage was rendered using server-side rendering techniques or client-side rendering techniques. Server-side rendering techniques include executing JavaScript and/or otherwise rendering webpage content (e.g., obtaining content in (or converting content to) HyperText Markup Language (HTML) at the server (e.g., in response to a request for a webpage such as a HTTP page request). Client-rendering techniques include any suitable combination of downloading and executing JavaScript that fetches and assembles webpage content at a client-side application (e.g., an application executing at the client device such as web browser or shopping app (an application configured to access an online electronic catalog of items)). In client-side rendering, minimal HTML defining a subset of the total webpage content and JavaScript (or a location from which the JavaScript can be obtained) is provided by the server. The client application then executes the JavaScript to complete rending of the webpage content at the client device. In server-side rendering, each webpage is rendered in its entirety in response to each page request. Thus, even if a relatively small portion of a webpage should change due to user input, the entire page will be rendered anew. Using client-side rendering techniques, changes to a webpage can be identified and only the content that has changed is removed and re-rendered. Client-side rendering is typically slower for the initial load of a webpage than server-side rendering due to the execution time needed for the client to render the content. However, client-side rendering is faster for subsequent loads because only the portion of the webpage that changed is re-rendered instead of rending the entire webpage anew as would be the case if rendered by the server.

When rendering content at the client device, the application (e.g., a web browser, a shopping application, etc.) parses the HTML and creates a document object model (DOM), a tree-like structure that represents the content of the webpage. The DOM includes nodes (node objects) corresponding to the parsed the HTML elements. Some client applications may be configured with libraries or frameworks (e.g., ReactJs, VueJs, etc.) that enable the application to load HTML into a virtual DOM separate from the DOM. Using both the DOM and virtual DOM, the application can identify a minimal number of components to re-render (e.g., by comparing both DOMs to each other and identifying which nodes have changed).

Webpages typically do not include mixed content. However, even if server-side rendered components were included with JavaScript for rendering one or more components at the client side, conventional client-side applications are not configured to understand how to inject the server-side component into the virtual DOM. Thus, the server-side rendered component would be loaded and appear to the user before the components that are rendered by the client-side application are ready for display. This can cause a disjointed experience for the user as the content would be appearing on the page at various times.

In some embodiments, the server-side rendered content may be included with JavaScript (or a location from which the JavaScript can be downloaded) from which the content can be rendered by the client-side application. Instead of immediately displaying the server-side rendered content, the server can mark such content with an indicator that indicates the content is initially to be hidden from view. The client-side application produces life-cycle events (e.g., componentWillMount( ) componentDidMount( ) componentWillUnmount( ) etc.) that indicate the state of mounting or unmounting the component in the DOM. In some embodiments, the JavaScript may include a function that unhides (makes visible) the server-side rendered component when the client-side rendered component is mounted. Thus, when the life-cycle event componentDidMount( ) is received, the application can execute operations to unhide the server-side rendered component, causing the client-side rendered components and the server-side rendered components to appear more closely in time (e.g., substantially at the same time) then would be possible using conventional techniques. In some embodiments, making the server-side rendered component visible may include changing an indicator associated with the server-side rendered component from a first value associated with a hidden state (in which the server-side rendered component is hidden/not visible) to a second value associated with a visible state (in which the server-side rendered component is visible/not hidden).

Some or all of the process (or any other processes described herein, or variations, and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Moving on to FIG. 1 which illustrates an example flow for rendering a webpage that includes mixed content (e.g., at least one server-side rendered component and at least one client-side rendered component), in accordance with at least one embodiment. The user device 112 may be any suitable device capable of rendering content (e.g., webpage data including visual and/or sound components) at one or more output devices (e.g., a display, a speaker, etc.). In some embodiments, the user device 112 include application 114 (e.g., a shopping application, a web browser, etc.) configured with functionality (e.g., provided by one or more JavaScript libraries) for processing JavaScript to render components of a webpage at the application.

The flow 110 may begin at 116, where a request (e.g., content request 120) to display a webpage (also referred to herein as a "network page") may be transmitted. In some embodiments, the request may be transmitted in response to receiving user input (e.g., a selection at user interface 118) at the application 114 operating at the user device 112. In response to receiving this user input, the application may transmit the request (e.g., content request 120) to content provider computer(s) 122. In some embodiments, the request may be in any suitable form and may identify a particular uniform resource locator or any suitable identifier of the webpage. In response to the request, the content provider computer(s) 122 may be configured to obtain the content associated with the webpage. In some embodiments, this content (also referred to as mixed content) may include at least one server-side rendered component and JavaScript for rendering one or more components at the application 114. In some embodiments, the content may include a location from which the JavaScript can be downloaded rather than the JavaScript itself. The content provider computer(s) 122 may provide the content to the user device 112 (via application 114) in response to the request transmitted at 116.

At 124, the application 114 may receive a response 126 that includes server-side rendered content (e.g., at least one component rendered at the server, such as server-side rendered content 128) and data corresponding to at least one component to be rendered by the client (e.g., data 130 corresponding to a component that is to be rendered by application 114). In some embodiments, the data 130 can be JavaScript or a location from which JavaScript can be downloaded.

At 132, the presentation of the server-side rendered content 128 can be delayed. By way of example, the server may provide a flag or other indicator with the server-side rendered content to indicate that the server-side rendered content should be initially hidden from view. In some embodiments, this flag/indicator may be provided as a wrapper that encapsulates the server-side rendered component. Upon receipt, the application 114 can interpret the flag/indicator to determine that the server-side rendered content is not yet to be presented.

At 134, if data 130 includes a location from which JavaScript can be downloaded, the application 114 can request the JavaScript code for a portion of the webpage from the location provided in data 130.

At 136, the application 114 may execute the code (e.g., the JavaScript obtained at 134) to tender the portion of the webpage (e.g., client-side rendered content 138). Upon completion of rendering client-side rendered content 138, the application 114 may be configured to set the flag/indicator associated with the server-side rendered content 128 to indicate the server-side content 128 is to be initially hidden from view.

At 130, the application 114 may display both the server side rendered content 128 and the client-side rendered content 138 at user interface 132.

By utilizing the techniques described herein, server-side rendered content and client-side rendered content can more effectively be integrated with one another such that both types of content are presented at substantially the same time. This provides a more seamless and less confusing experience for the user.

Figure 2:
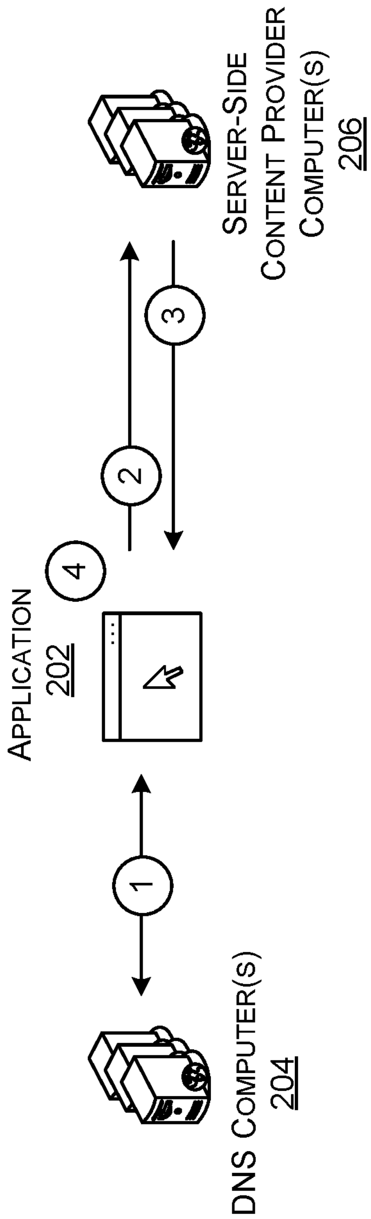
FIG. 2 is a flow illustrating a conventional method for rendering web content at a client-side application using server-side rendering techniques.

FIG. 2 illustrating a conventional method 200 for rendering web content at a client-side application (e.g., application 202, an example of the application 114 of FIG. 1) using server-side rendering techniques. The user may utilize any suitable user interface and/or input device to navigate to a particular webpage associated with a particular uniform resource locator (URL). For example, user input such as a URL may be received at an interface of the user device. The method 200 may begin immediately after the user's navigational input is received.

At step 1, in response to user input indicating the user desires to navigate to a particular webpage, the application 202 transmits any suitable number of DNS requests to DNS computer(s) 204. By way of example, the application 202 may transmit a DNS request for the webpage requested by the user. The DNS computer(s) 204 may be any suitable device (e.g., recursive resolvers, root name servers, top level domain name servers, and/or authoritative name servers) configured to translate domain names and/or hostnames to their corresponding numeric internet protocol (IP) addresses from which content may be obtained. The application 202 may receive the IP address of the requested webpage from DNS computer(s) 204.

At step 2, the application 202 transmits a page request to the server-side content provider computer(s) 206 using the IP address received from DNS computer(s) 204. In some embodiments, the page request can be in the format of an HTTP page request. The page request may include any suitable data (e.g., IP address) for identifying the data and/or webpage requested.

At step 3, the server-side content provider computer(s) 206 may transmit webpage content corresponding to the requested webpage (e.g., webpage content rendered at the server such as server-side rendered content 128 of FIG. 1) to the application 202 in response to the page request. The application 202 may generate a document object model (DOM) from the content provided. Each node of the DOM may correspond to a component defined in the content provided (e.g., HTML provided by the server-side content provider computer(s) 306).

At step 4, the application 202 executes any suitable operations to process the webpage content (e.g., server-side rendered content 128) received from the server-side content provider computer(s) 206. By way of example, the webpage content may include HTML which is parsed and interpreted by the application 202 to present the content in accordance with the HTML.

Figure 3:
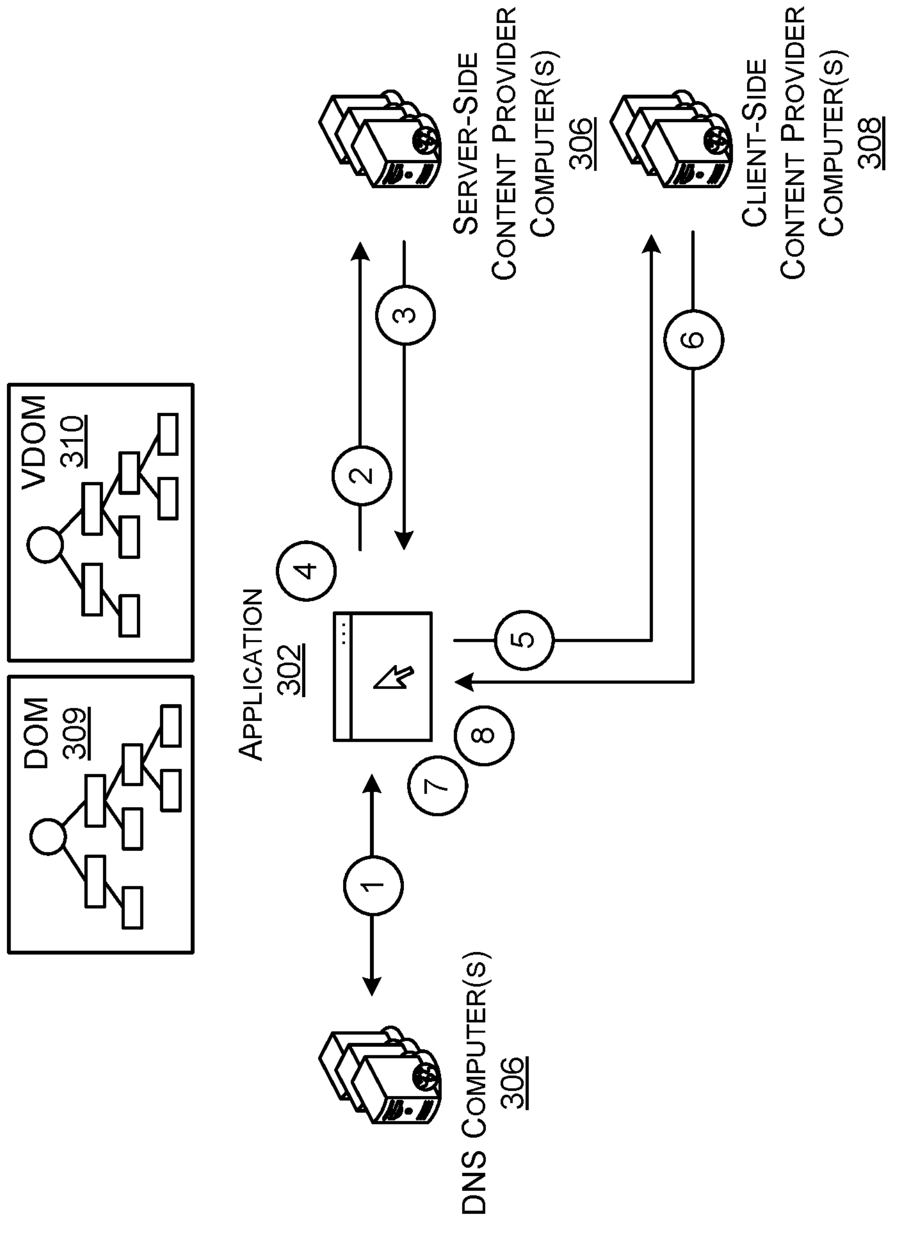
FIG. 3 is a flow illustrating a conventional method for rendering web content at a client-side application using client-side rendering techniques.

FIG. 3 is a flow illustrating a conventional method 300 for rendering web content (e.g., client-side rendered content 138 of FIG. 1) at a client-side application (e.g., application 302, an example of the application 202 and application 114 of FIGS. 1 and 2, respectively) using client-side rendering techniques. Steps 1 and 2 of method 300 correspond to steps 1 and 2 of the method 200 of FIG. 2 and may be performed by the same or similar components (e.g., application 302, DNS computer(s) 304 an example of the DNS computer(s) 204 of FIG. 2, server-side content provider computer(s) 306 an example of the server-side content provider computer(s) 206 of FIG. 2, etc.)

At step 3, the server-side content provider computer(s) 406 may transmit, in response to the page request, web content to the client device (e.g., user device 112 of FIG. 1) executing the application 302. In some cases, the web content may include server-side rendered content (e.g., server-side rendered content 128 of FIG. 1) and/or data (e.g., data 130) for rendering some portion of the webpage at the client device. By way of example, the data can include JavaScript that, when executed generates some portion of the webpage to be presented. In some embodiments, the data 130 can include a reference to a location from which the actual code (e.g., JavaScript) may be obtained.

At step 4, the application 302 may process the web content received from the web server computer(s) 306 (e.g., the server-side rendered content and/or the data corresponding to any components to be rendered by the application 302). The application 202 may generate a document object model (DOM) (e.g., DOM 309) from the content provided. Each node of the DOM 309 may correspond to a component defined in the content provided (e.g., HTML provided by the server-side content provider computer(s) 306). In some embodiments, if server-side rendered content is received, one or more nodes of the DOM 309 may be created to represent this server-side rendered content. If server-side rendered content is received, the application 302 may immediately present such content.

At step 5, the application 302 can process the data received at step 3 corresponding to one or more components of the webpage that are to be rendered by the application 302 via JavaScript. This processing can include transmitting any suitable number of DNS requests to identify IP addresses for any suitable portion of the webpage content (e.g., the IP addresses corresponding to location(s) from which JavaScript can be downloaded, location(s) from which various assets (e.g., images, sound files, video files, etc.) can be downloaded, or the like). For example, one or more requests may be transmitted to client-side content provider computer(s) 308 which may be configured to maintain data (e.g., JavaScript, assets such as images, text, hyperlinks, and the like) corresponding to one or more components to be rendered by the application 302. In some embodiments, the client-side content provider computer(s) 308 may be the same as or different from the server-side content provider computer(s) 306 or the client-side content provider computer(s) 308 may be associated with the same or different content provider as the content provider associated with the server-side content provider computer(s) 306.

At step 7, the client-side content provider computer(s) 308 may forward the requested content (e.g., JavaScript and/or assets) to the application 302.

At step 8, the application 302 may process the content received from the client-side content provider computer(s) 308. In some embodiments, this includes executing the JavaScript code received from the client-side content provider computer(s) 308. FIGS. 8-9 will discuss this code in more detail. Processing the content may also include generating a virtual DOM (e.g., virtual DOM 310). The application may compare the DOM 309 generated at step 4 with the virtual DOM 310 to identify a difference between the two. Based on this comparison, the application 302 can identify that the client-side rendered components have not been presented, and may present those components at step 9.

Figure 4:
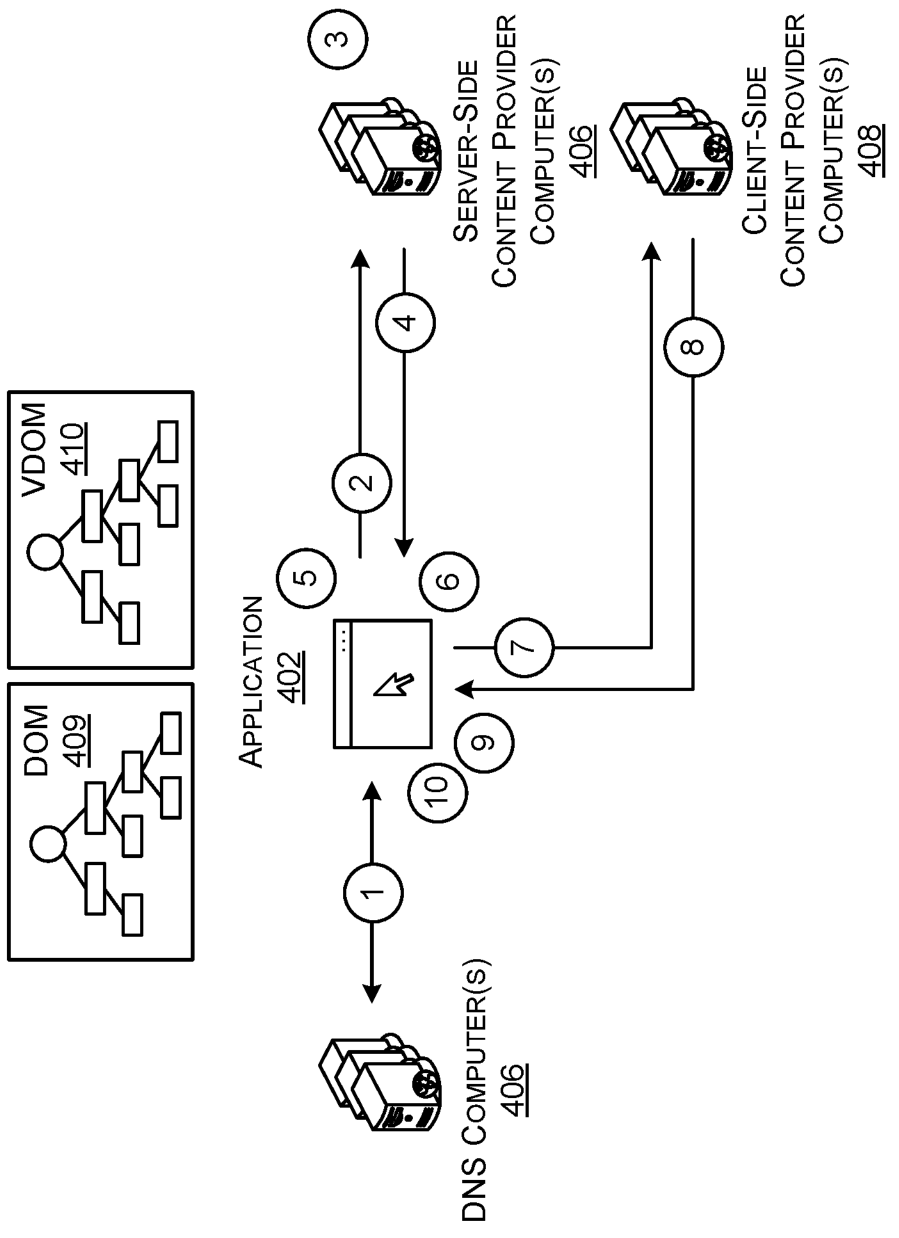
FIG. 4 is a flow illustrating an example method for rendering web content that includes mixed content including at least one server-side rendered component and at least one client-side rendered component, in accordance with at least one embodiment.

FIG. 4 is a flow illustrating an example method 400 for rendering web content that includes mixed content including at least one server-side rendered component (e.g., the server-side rendered content 128 of FIG. 1) and at least one client-side rendered component (e.g.,. the client-side rendered content 130 of FIG. 1), in accordance with at least one embodiment.

The method 400 may begin at step 1. Steps 1 and 2 of method 400 correspond to steps 1 and 2 of the method 300 of FIG. 3 and may be performed by the same or similar components (e.g., application 402, DNS computer(s) 404 an example of the DNS computer(s) 304 of FIG. 3, server-side content provider computer(s) 406 an example of the server-side content provider computer(s) 306 of FIG. 3, etc.).

At step 3, the server-side content provider computer(s) 406 may be configured to execute operations to respond to the request received at step 2. By way of example, the server-side content provider computer(s) 406 may execute code such the example code provided in FIG. 8. These operations may cause server-side content to be rendered at the server-side content provider computer(s) 406. In some embodiments, the server-side content provider computer(s) 406 may encapsulate the server-side content (e.g., a payment widget) in a wrapper. In some embodiments, an indicator may be included (e.g., in the wrapper or otherwise) with the server-side content that indicates the server-side content is to be (at least initially) hidden from view. In some embodiments, the operations performed at the server-side content provider computer(s) 406 may include identifying and including in the response to the application 402, one or more code segments for rendering client-side content of the requested webpage and/or locations from which such code segments can be retrieved. FIGS. 9 and 10 may be examples of such code segments that may be included (or referenced by location) in the response.

In some embodiments, both server-side rendered content and data corresponding to one or more components to be rendered at the application 402 is received at step 4. The application 402 may process the web content received from the web server computer(s) 406 (e.g., the server-side rendered content and/or the data corresponding to any components to be rendered by the application 402). The application 402 may generate a document object model (DOM) (e.g., DOM 409) from the content provided. Each node of the DOM 409 may correspond to a component defined in the content provided (e.g., HTML provided by the server-side content provider computer(s) 306). In some embodiments, if server-side rendered content is received, one or more nodes of the DOM 409 may be created to represent this server-side rendered content. In some embodiments, the data corresponding to the one or more components to be rendered at the application 402 may be the code segments provided in FIGS. 8 and 9 and/or one or more location(s) (e.g., URLs) from which such code segments may be obtained (e.g., downloaded).

At step 5, the application 402 may process the response and determine that the server-side rendered content is provided in a wrapper that includes an indicator that indicates the server-side content is to be hidden. In some embodiments, any suitable label and/or indicator may be included with the server-side content and may serve as an indicator that the content is not to be displayed. As a result of this indicator, presentation of the server-side rendered content may be delayed by the application 402.

Steps 7 and 8 of method 400 generally correspond to steps 5 and 6 of method 300 and will not be repeated for brevity.

At step 9, the application 402 may process the content received from the client-side content provider computer(s) 408. In some embodiments, this includes executing the JavaScript code received from the client-side content provider computer(s) 408. FIGS. 9 and 10 will discuss this code in more detail. Processing the content may also include generating a virtual DOM (e.g., virtual DOM 410, an example of the virtual DOM 310 of FIG. 3). The virtual DOM may include the client-side content received at step 4. The application 402 may compare the DOM 409 generated at step 4 with the virtual DOM 410 to identify a difference between the two. Based on this comparison, the application 402 can mount addition nodes (e.g., nodes corresponding to the difference between the DOM 409 and the virtual DOM 410) to the DOM 409 that correspond to the components generated as a result of the execution of the JavaScript and/or the retrieval of one or more assets (e.g., text, images, hyperlinks, etc.).

At step 10, once the components generated as a result of the execution of the JavaScript have been mounted, a life-cycle event may be generated by the application 402 indicating the nodes have been mounted. The generation of the life-cycle event may trigger (or call a corresponding function that includes) code that modifies the server-side rendered content from a hidden state (in which the server-side rendered content is hidden from view) to a non-hidden state (in which the server-side rendered content is presented). By way of example, if an indicator was used (e.g., with or without a wrapper) to indicate the server-side content was to be hidden, any suitable operations may be executed to set the indicator to a value that corresponds to a non-hidden state. In response to setting the indicator to this non-hidden state value, the application 402 may present the previously hidden server-side rendered content with the client-side rendered content.

The techniques described in FIG. 4 enable server-side rendered content to be presented at substantially the same time as the client-side rendered content generated by the application 402. This creates a more uniform experience for the user.

Figure 5:
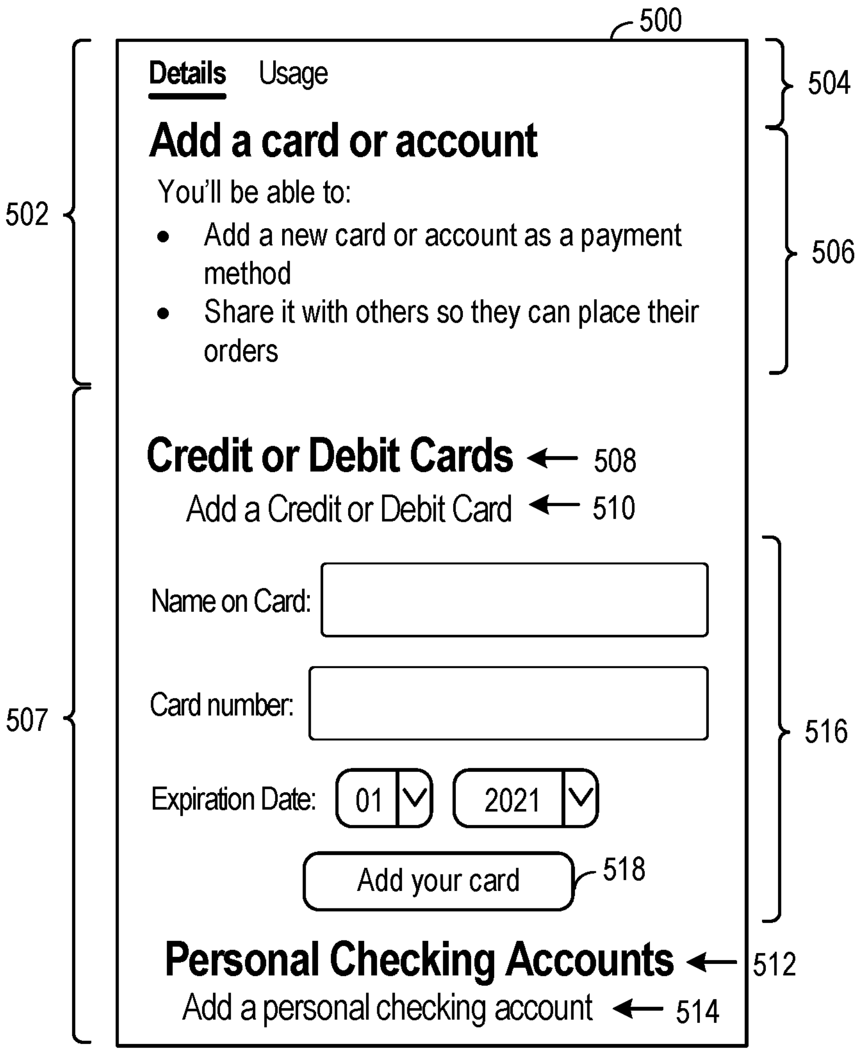
FIG. 5 is an example webpage including at least one server-side rendered component and at least one client-side rendered component, in accordance with at least one embodiment.
Figure 6:
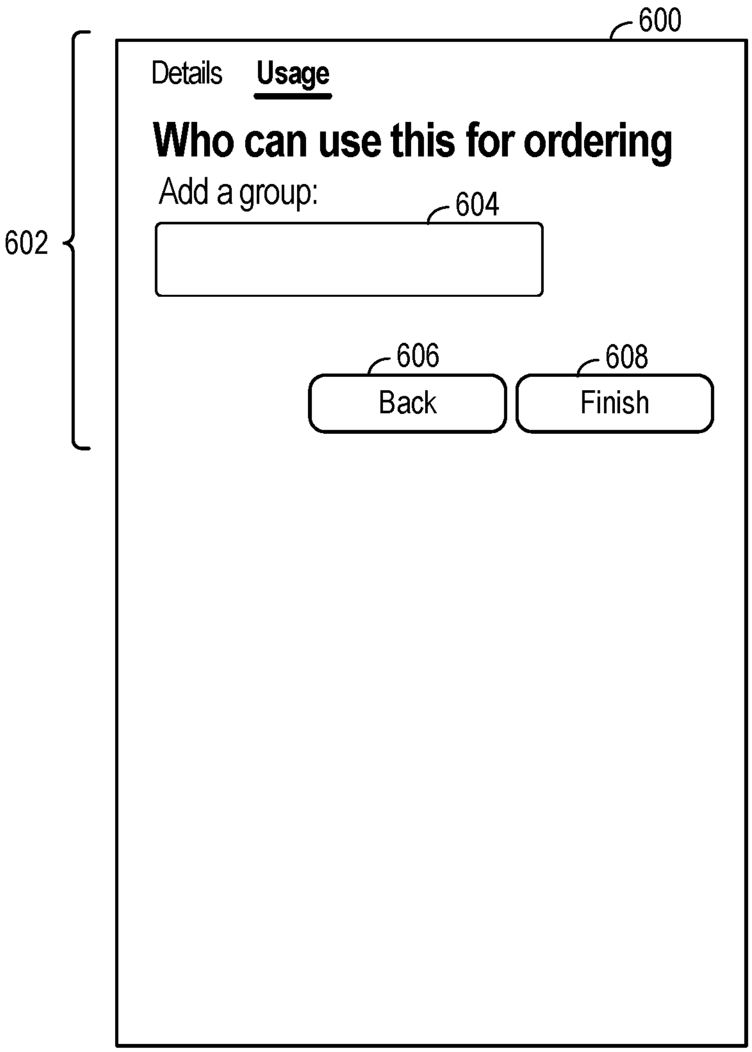
FIG. 6 is another example webpage including client-side rendered components, in accordance with at least one embodiment.
Figure 7:
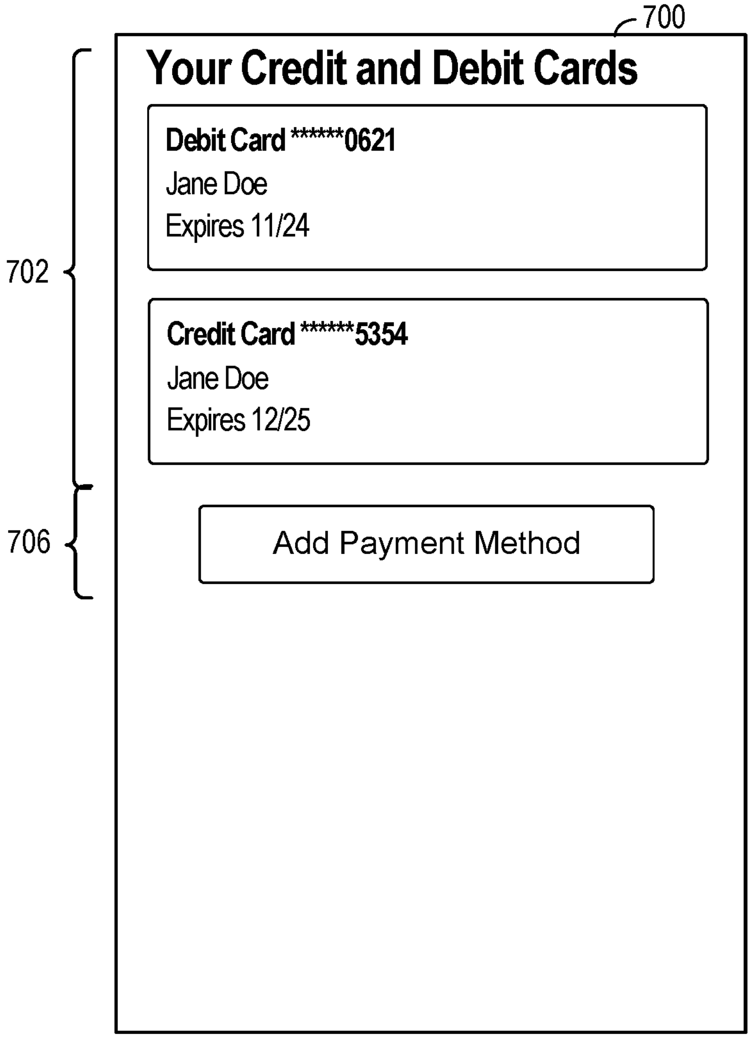
FIG. 7 is yet another example webpage including at least one server-side rendered component and at least one client-side rendered component, in accordance with at least one embodiment.

FIGS. 5-7 describe an exemplary flow for rendering a number of webpages that include server-side and/or client-side rendered content. In some embodiments, the webpages of FIGS. 5-7 may be used to add details of a credit or debit card that may be then associated with a user account (e.g., a user account of an online retail website).

FIG. 5 is an example webpage 500 including at least one server-side rendered component and at least one client-side rendered component, in accordance with at least one embodiment. By way of example, webpage 500 includes client-side rendered content 502. Client side rendered content 502 may include any suitable combination of text, menus, graphical elements such as edit boxes, text boxes, buttons, and the like. As presented, client-side rendered content 502 includes menus 504 and text 506. Client-side rendered content 502 may be generated using the client-side rendering techniques discussed above in connection with FIGS. 1 and 4.

Server-side rendered content 507 may include content 507. In some embodiments, server-side rendered content 507 may correspond to a payment widget (e.g., an application) with which methods of payment may be added to/associated with a user account (e.g., a user account associated with an online retail website), shared with one or more users, and/or presented at a client device (e.g., via a client-side application like the application 402 of FIG. 4). Initially, server-side rendered content 507 may include text 508, hyperlink 510, text 512, and hyperlink 514 which are presented with client-side rendered content 502 after client-side rendered content 502 is generated by the application 402 of FIG. 4. In some embodiments, text 508, hyperlink 510, text 512, and hyperlink 514 is provided via a first request (e.g., a first request to the server-side content provider computer(s) 406 of FIG. 4).

In some embodiments, selection of hyperlink 510 may cause a second request to be transmitted to the server-side content provider computer(s) 402. This request may result in graphical elements 516 being provided and presented by the application. In some embodiments, the application may identify (e.g., using the virtual DOM 410 of FIG. 4), in response to receiving the response to the second request, that nothing in content 502 has changed. Thus, selection of the hyperlink 510 may cause graphical elements 516 to be presented, but may perform no changes to the content 502. Selection of button 518 may cause the webpage 500 to change to present the components of FIG. 6.

FIG. 6 is another example webpage 600 including client-side rendered components, in accordance with at least one embodiment. In some embodiments, webpage 600 may include client-side rendered content 602. Client-side rendered content 602 may be rendered at the client device without requesting any additional information from the server. That is, the client-side rendered content 602 may be rendered by the application using the code (or location from which the code was downloaded) received in response to the first request to the server discussed in connection with FIG. 5. In some embodiments, the graphical element 604 may be used to add a group (e.g., provide a name for a group) and, in response, the user may specify one or more users that are authorized to use the payment method at issue. In some embodiments, the client-side rendered content may include back button 606 and finish button 608. Upon selection of back button 608, the user may be navigated back to webpage 500 of FIG. 5 as provided after the response to the second request to the server was received. In some embodiments, this would include making a third request to the server and receiving a response that included similar or the same information as received in response to the second request to the server. Selecting finish button 608 may cause webpage 700 of FIG. 7 to be displayed. To obtain the content for webpage 700, another request (e.g., a fourth request) to the server for server-side rendered content may be transmitted by the application.

FIG. 7 is yet another example webpage 700 including at least one server-side rendered component and at least one client-side rendered component, in accordance with at least one embodiment. By way of example, webpage 700 includes server-side rendered content 702. In some embodiments, server-side rendered content 702 may correspond to a payment widget (e.g., application) with which methods of payment may be added/associated with a user account, shared with one or more users, and/or presented at the application. Server-side rendered content 702 may include any suitable combination of text, menus, graphical elements such as edit boxes, text boxes, buttons, and the like. As depicted in FIG. 7, server-side rendered content 702 includes text presenting data corresponding to all payment methods (in this case, a debit card and a credit card) associated with the user's account (e.g., the information of debit card ***0621 being entered via the server-side rendered content 516 of FIG. 5**).

Initially, server-side rendered content 702 be hidden and presented only after client-side rendered content 706 is generated by the application 402 of FIG. 4. Client-side rendered content 706 may be generated using the client-side rendering techniques discussed above in connection with FIGS. 1 and 4. In some embodiments, the client-side rendered content 706 may include a button that, upon selection, submits another page request (e.g., to the server-side content provider computer(s) 406 of FIG. 4) for the webpage 500. Thus, selection of the button may cause the user to be navigated back to webpage 500 where client-side content 502 and server-side rendered content 507 (e.g., text 508 and 512 and hyperlinks 510 and 514) may once again be presented.

The code for implementing the webpages 500-700 may include any suitable coding components. In some embodiments, the coding components may conform to a model-view-controller (MVC) software design pattern. In an MVC software design pattern, one portion of the code (e.g., the model) code is the central component of the pattern and defines the application data structure independent of the user interface. The model code manages the data, logic, and rules of the application. Another portion of the code (e.g., the view code) corresponds to rendering a presentation of the model in a particular format. A third portion of the code (e.g., the controller code) accepts input and converts it to commands for the model or view code. FIGS. 9 and 10 are illustrative examples of these portions of code.

FIG. 8 is an example code excerpt 800 illustrating exemplary controller code, in accordance with at least one embodiment. In some embodiments, code excerpt 800 may be executed by a server computer (e.g., the server-side content provider computer(s) 406 of FIG. 4). Code except 800 (e.g., a Java code excerpt) defines a class "AddPaymentFlowController" as depicted at 802. The class may include one or more functions (e.g., "AddPaymentInstrument" as depicted at 804). When the AddPaymentInstrument function is called, HTML (e.g., stored as "addPaymentWidget") for a payment widget may be fetched at 806, added to an object at 808, and passed to the view code of FIG. 9 using statement 810.

FIG. 9 is an example code excerpt 900 illustrating exemplary view code, in accordance with at least one embodiment. In some embodiments, code excerpt 900 may be an example of code provided in response to the first request to the server discussed in connection with FIG. 5. Alternatively, code excerpt 900 may be downloaded by using a location provided in the response to the first request as provided by that server. Code excerpt 900 (e.g., a JavaScript code excerpt) defines a number of event handlers at 902. By way of example, a widget action event handler may be defined at 904 such that, upon detection of this event (e.g., selection of the button 518 of FIG. 5), causes the application to provide the webpage 600 of FIG. 6. In some embodiments, webpage 600 may be wholly rendered by the client application without an additional request to the server. At 906, the code excerpt 900 may include code that attaches all events defined above to a payments portal window (e.g., the widget object corresponding to the server-side rendered content 507 and 702 of FIGS. 5 and 7, respectively.

Code excerpt 900 may include section 908 which identifies a root at 910 corresponding to a java library of the client application (e.g., the application 402 of FIG. 4). In some embodiments, the statement 912 may inject a location (e.g., a URL) from which the code excerpt 1000 of FIG. 10 may be obtained (e.g., by the application). Wrapper 914 is provided and includes a flag (e.g.,"aok-hidden") which indicates the data encapsulated by the wrapper is to be hidden from view. In the embodiment depicted, the HTML fetched for the payment widget may be identified at 916 and, therefore, initially hidden from view within the browser based at least in part by being encapsulated by wrapper 914. Thus, in some embodiments, the server executes the code excerpt 800 of FIG. 8 to provide, in response to a request from the application, the code excerpt 900 of FIG. 9, within which a location may be provided (e.g., via the statement 912) from which the code excerpt 1000 of FIG. 10 may be obtained (e.g., from the server-side content provider computer(s) 408 of FIG. 4).

FIG. 10 is an example code excerpt 1000 illustrating client-side code, in accordance with at least one embodiment. In some embodiments, code excerpt 1000 may be provided in response to the first request to the server discussed above in connection with FIG. 5. In some embodiments, code excerpt 1000 may be downloaded by using a location provided in the response to the first request as provided by that server. Code excerpt 1000 may include event handler(s) 1002 which define what functionality will be executed in response to detecting one or more particular events. Code excerpt 1000 may include functions 1004 that include an addPaymentWidgetShow function, an addPaymentWidgetHide function, and an addPaymentPageInitialize. The addPaymentWidgetShow function may be configured to, when executed, modify the flag of wrapper 914 of FIG. 9 to a value corresponding to presenting the data encapsulated by the wrapper. Thus, by calling the addPaymentWidgetShow function, the browser may enable presentation of previously hidden content (e.g., the server-side rendered content of FIGS. 5 and 7, respectively). The addPaymentWidgetHide function may be configured to, when executed, modify the flag of wrapper 914 of FIG. 9 to a value corresponding to hiding the data encapsulated by the wrapper. Thus, by calling the addPaymentWidgetHide function, the browser may hide content (e.g., the server-side rendered content of FIGS. 5 and 7, respectively). The addPaymentPageInitialize function may be configured to, when executed, modify the flag of wrapper 914 of FIG. 9 to a value corresponding to hiding the data encapsulated by the wrapper. Thus, by calling the addPaymentPageInitialize function, the browser may disable and overlay the payments portal widget and redirect the page to add additional information about the payment method.

As defined in event handler(s) 1002, receiving a componentWillMount event will cause the addPaymentPageInitialize function to be called to initialize the page. This event occurs prior to mounting any client-side rendered data. As defined in event handler(s) 1002, receiving a componentDidMount event will cause the addPaymentWidgetShow function to be called to make the payment widget (e.g., the server-side rendered content of FIG. 5 or 7, respectively) to be presented (even if previously hidden). This event occurs after mounting the client-side rendered data (e.g., to the virtual DOM 410 of FIG. 4). As defined in event handler(s) 1002, receiving a componentWillUnmount event will cause the addPaymentWidgetHide function to be called to make the payment widget (e.g., the server-side rendered content of FIG. 5 or 7, respectively) to be hidden (even if previously presented). This event may occur after a payment has been added.

Code excerpt 1000 may include a render function 1006. The render function may include any suitable components, variables, values, or the like for rendering navigational components such as, but not limited to, a page index, header, body, section, links, navigation bars, buttons, and the like.

Figure 11:
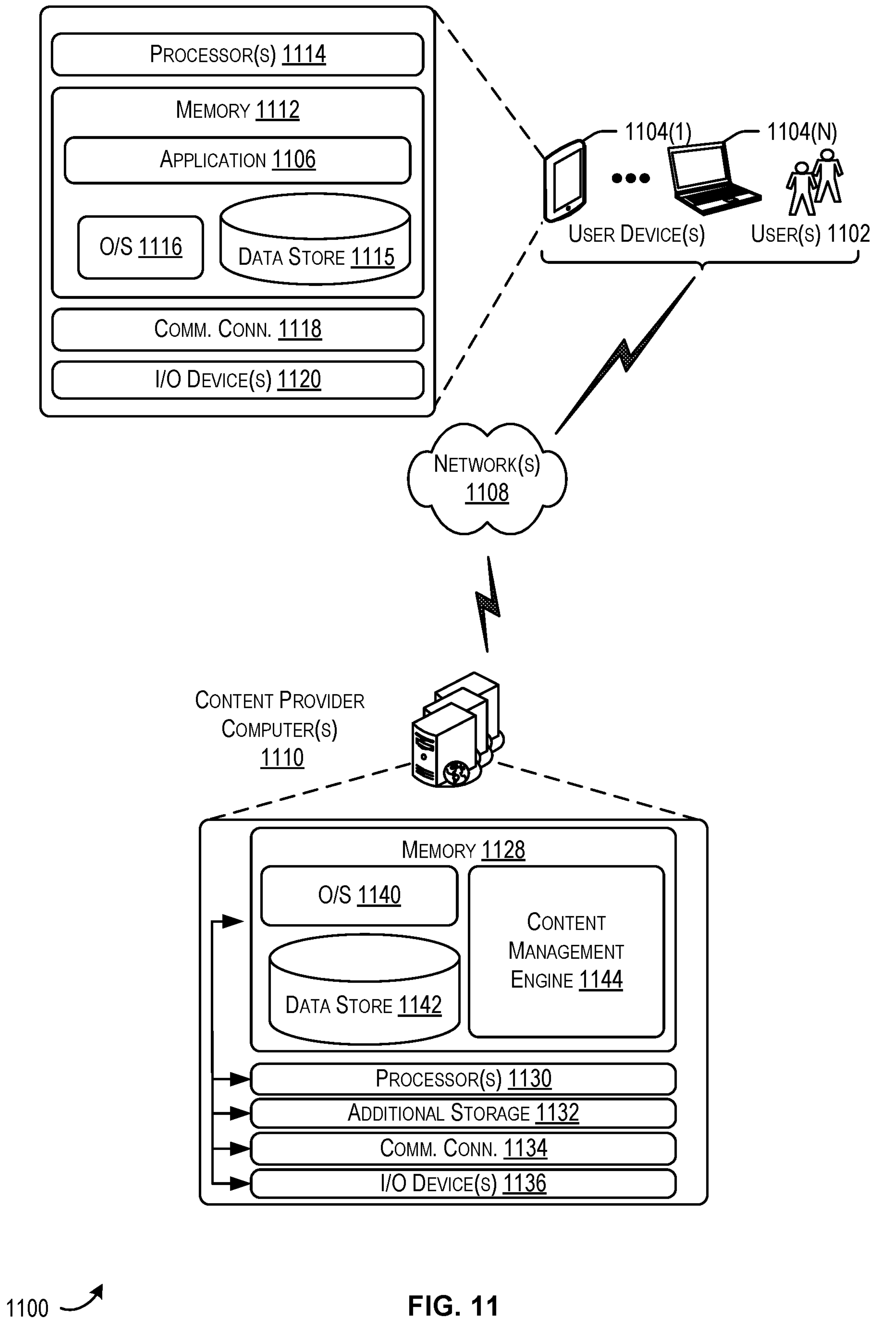
FIG. 11 is a schematic diagram of an example computer architecture for a content management engine, including a plurality of modules that may perform functions in accordance with at least one embodiment.

FIG. 11 illustrates components of a system 1100 according to a particular embodiment. In system 1100, one or more user(s) 1102 may utilize a user device (e.g., a user device of a collection of user device(s) 1104 to access a user interface accessible through an application 1106 running on the user device(s) 1104 via one or more network(s) 1108. In some aspects, the application 1106 operating on the user device(s) 1104 may be hosted, managed, and/or provided by a computing resources service or service provider, such as by utilizing one or more content provider computer(s) 1110. In some embodiments, the application 1106 may be a web browser (e.g., any suitable software application that is configured to access data on the World Wide Web/the Internet) and/or an application (sometimes referred to as "a shopping application) that is configured to access an online electronic catalog of items (e.g., one or more items offered for consumption). When the user(s) 1102 request a webpage (e.g., webpage content associated with a particular webpage), the application 1106 may be configured to transmit a request to content provider computer(s) 1110 (an example of the content provider computer(s) xxx and/or xxx of FIGS. 2-4. The content provider computer(s) 1110 may include any suitable combination of one or more web servers, content delivery networks, advertisement computer(s) and/or networks, domain name system (DNS) computer(s), or the like. As used herein, a DNS computer may be any suitable device (e.g., recursive resolvers, root name servers, top level domain name servers, and/or authoritative name servers) configured to translate domain names and/or hostnames to their corresponding numeric internet protocol (IP) addresses from which content may be obtained.

In some examples, the network(s) 1108 may include any one or a combination of many different types of networks, such as cable networks, the Internet, wireless networks, cellular networks, and other private and/or public networks. While the illustrated example represents the user(s) 1102 accessing application functionality over the network(s) 1108, the described techniques may equally apply in instances where the user(s) 1102 interact with the content provider computer(s) 1110 via the one or more user device(s) 1104 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the content management engine 1144, discussed further below in more detail, may operate in whole or in part on the user device(s) 1104. Thus, in some embodiments, the user(s) 1102 may access the functionality of the content management engine 1144 directly through the user device(s) 1104 and/or the content provider computer(s) 1110 via user interfaces provided by the content management engine 1144.

The content provider computer(s) 1110, perhaps arranged in a cluster of servers or as a server farm, may host the application 1106 operating on the user device(s) 1104 and/or cloud-based software services. Other server architectures may also be used to host the application 1106 and/or cloud-based software services. The application 1106 operating on the user device(s) 1104 may be capable of handling requests from the user(s) 1102 and serving, in response, various user interfaces that can be rendered at the user device(s) 1104. The application 1106 operating on the user device(s) 1104 can present any suitable type of website that supports user interaction, including search engine sites, news websites, social media websites, and the like. The described techniques can similarly be implemented outside of the application 1106, such as with other applications running on the user device(s) 1104.

The user device(s) 1104 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 1104 may be in communication with the content provider computer(s) 1110 via the network(s) 1108, or via other network connections.

In one illustrative configuration, the user device(s) 1104 may include at least one memory 1112 and one or more processing units (or processor(s)) 1114. The processor(s) 1114 may be implemented as appropriate in hardware, computer-executable instructions, firmware, or combinations thereof. Computer-executable instruction or firmware implementations of the processor(s) 1114 may include computer-executable or machine-executable instructions written in any suitable programming language to perform the various functions described.

The memory 1112 may store program instructions that are loadable and executable on the processor(s) 1114, as well as data generated during the execution of these programs. Depending on the configuration and type of user computing device, the memory 1112 may be volatile (such as random access memory (RAM)) and/or non-volatile (such as read-only memory (ROM), flash memory, etc.). The user device(s) 1104 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 1112 may include multiple different types of memory, such as static random access memory (SRAM), dynamic random access memory (DRAM), or ROM.

Turning to the contents of the memory 1112 in more detail, the memory 1112 may include an operating system 1116, one or more data stores 1115, and one or more application programs, modules, or services provided via the application 1106 (e.g., a web browser application, a shopping application associated with an online retailer, etc.). The application 1106 may be configured to receive, store, and/or display a network page or other interfaces for interacting with the content provider computer(s) 1110. The application 1106 may include any suitable functionality for interacting with the content provider computer(s) 1110. Additionally, the memory 1112 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 1104 may also contain communications connection(s) 1118 that allow the user device(s) 1104 to communicate with a stored database, another computing device or server (e.g., the content provider computer(s) 1110), user terminals and/or other devices on the network(s) 1108. The user device(s) 1104 may also include I/O device(s) 720, such as a keyboard, a mouse, a pen, a voice input device, a touch input device, a display, speakers, a printer, etc.

In some aspects, the content provider computer(s) 1110 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the content provider computer(s) 1110 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the content provider computer(s) 1110 may be in communication with the user device(s) 1104 and/or other service providers via the network(s) 1108 or via other network connections. The content provider computer(s) 1110 may include one or more servers, perhaps arranged in a cluster, as a server farm, or as individual servers not associated with one another. These servers may be configured to implement the functionality described herein as part of an integrated, distributed computing environment.

In one illustrative configuration, the content provider computer(s) 1110 may include at least one memory 1128 and one or more processing units (or processor(s)) 1130. The processor(s) 1130 may be implemented as appropriate in hardware, computer-executable instructions, firmware, or combinations thereof. Computer-executable instruction or firmware implementations of the processor(s) 1130 may include computer-executable or machine-executable instructions written in any suitable programming language to perform the various functions described.

The memory 1128 may store program instructions that are loadable and executable on the processor(s) 1130, as well as data generated during the execution of these programs. Depending on the configuration and type of content provider computer(s) 1110, the memory 1128 may be volatile (such as RAM) and/or non-volatile (such as ROM, flash memory, etc.). The content provider computer(s) 1110 or servers may also include additional storage 1132, which may include removable storage and/or non-removable storage. The additional storage 1132 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 1128 may include multiple different types of memory, such as SRAM, DRAM, or ROM.

The memory 1128, the additional storage 1132, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 1128 and the additional storage 1132 are all examples of computer storage media. Additional types of computer storage media that may be present in the content provider computer(s) 1110 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the content provider computer(s) 1110. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The content provider computer(s) 1110 may also contain communications connection(s) 1134 that allow the content provider computer(s) 1110 to communicate with a stored database, another computing device or server, user terminals and/or other devices on the network(s) 1108. The content provider computer(s) 1110 may also include I/O device(s) 1136, such as a keyboard, a mouse, a pen, a voice input device, a touch input device, a display, speakers, a printer, etc.

Turning to the contents of the memory 1128 in more detail, the memory 1128 may include an operating system 1140, one or more data stores 1142, and/or one or more application programs, modules, or services for implementing the features disclosed herein, such as the features provided by the content management engine 1144. The content management engine 1144 may be configured to perform the operations discussed above in connection with the content provider computer(s) of FIGS. 2-4.

Figure 12:
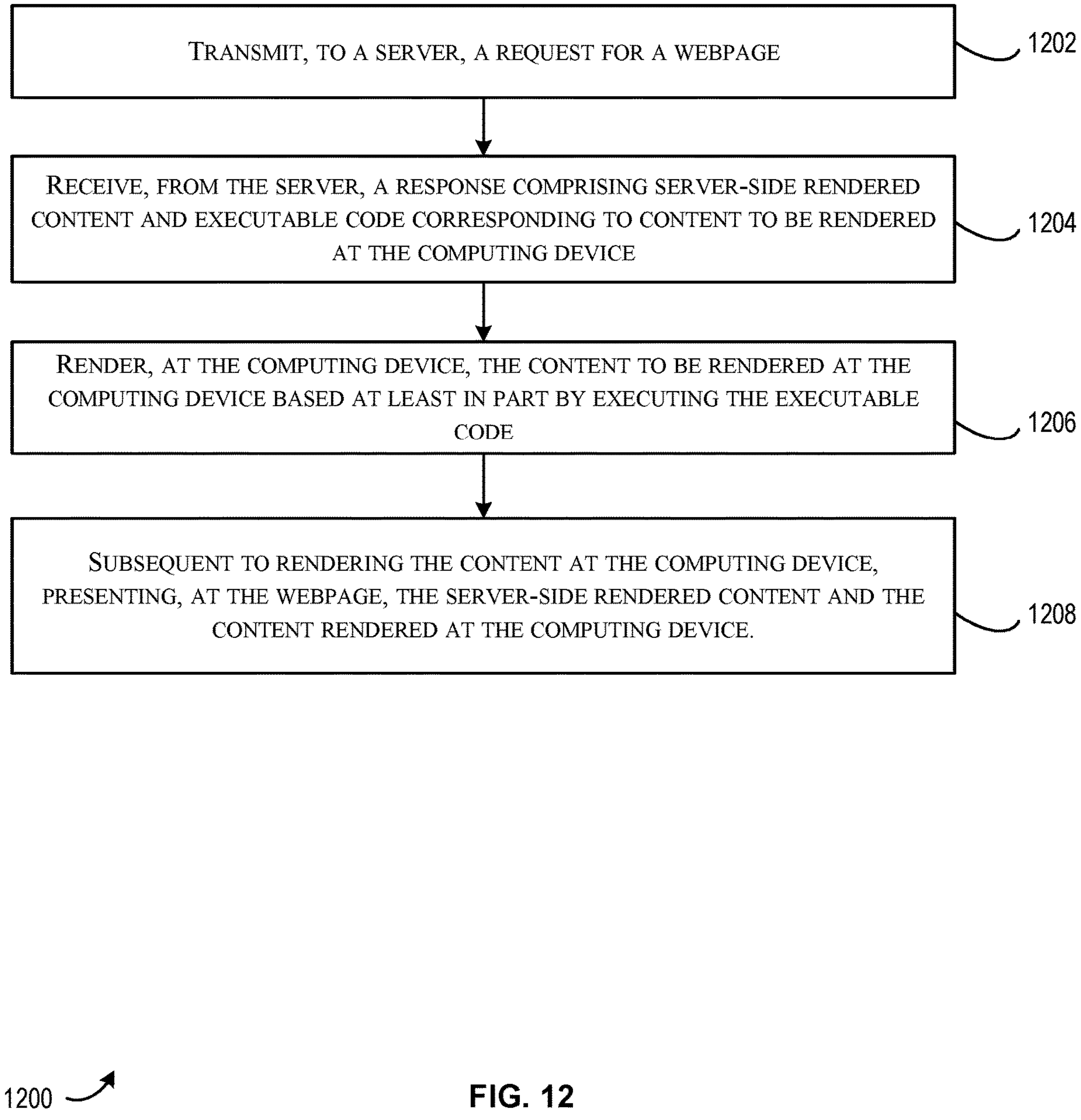
FIG. 12 is a flowchart illustrating an example method for accelerating page rendering at a user device, in accordance with at least one embodiment.

FIG. 12 is a flowchart illustrating an example method 1200 for rendering mixed content at a client device, in accordance with at least one embodiment. A non-transitory computer-readable medium may store computer-executable instructions that, when executed by at least one processor, causes a computing device (e.g., a user device of the user device(s) 1104 of FIG. 11) to perform instructions comprising the operations of the method 1200. It should be appreciated that the operations of the method 1200 may be performed in any suitable, not necessarily the order depicted in FIG. 12. Further, the method 1200 may include additional, or fewer operations than those depicted in FIG. 12. The operations of method 1200 may be performed by any suitable combination of the content management engine 1144 of FIG. 11 and/or by any suitable application (e.g., the application 1106 of FIG. 11) operating at a user device (e.g., the user device(s) 1104 of FIG. 11).

The method 1200 may begin at 1202, where a request (e.g., an HTTP page request) for a webpage may be transmitted (e.g., by an application executing at a user device such as application 402 of FIG. 4, application 1106 of FIG. 7, etc.) to a server (e.g., the server-side content provider computer(s) 406 of FIG. 4). In some embodiments, the request may include a uniform resource locator or other suitable identifier for the webpage. Upon receipt of the request, the server may be configured to render server-side rendered (SSR) content corresponding to a portion of the webpage. In some embodiments, the SSR content may comprise a widget (e.g., an additional application, such as a payment application for viewing and/or generating various aspects of payment methods to be associated with an online account associated with the user of the user device). In some embodiments, the widget may include any suitable number of user interface elements for interacting with the additional application.

At 1204, a response may be received from the server. In some embodiments, the response may include the server-side rendered content and data (e.g., executable code, a location from which the executable code may be downloaded, etc.) corresponding to content to be rendered at the computing device. In some embodiments, the server-side rendered content may be received with an indicator set to a value associated with a hidden state (e.g., a state in which the server-side rendered content is hidden from view). In some embodiments, the indicator may be included in a wrapper that encapsulates the server-side rendered content.

At 1206, the content may be rendered at the computing device (e.g., by the applications 402/1006 of FIGS. 4/10). In some embodiments, the content may be rendered by executing code (e.g., JavaScript, any suitable portion of the code excerpts 800-900 of FIGS. 8-9, etc.). In some embodiments, at least a portion of the code may be provided in the response received at 1204. In some embodiments, any suitable portion (e.g., some, all) of the code may be downloaded from a location provided in the response. Downloading that portion of the code may be done via one or more additional page requests transmitted by the application.

At 1206, after rendering the content, the server-side rendered content and the content may be presented, substantially simultaneously, at the computing device (e.g., by the application). In some embodiments, rendering the server-side rendered content may include changing a value associated with the indicator described above (e.g., the indicator included in the wrapper that encapsulated the server-side rendered content) from one value (e.g., associated with a hidden state) to another value (e.g., corresponding to a viewable state in which the server-side rendered content is presented at the webpage).

Figure 13:
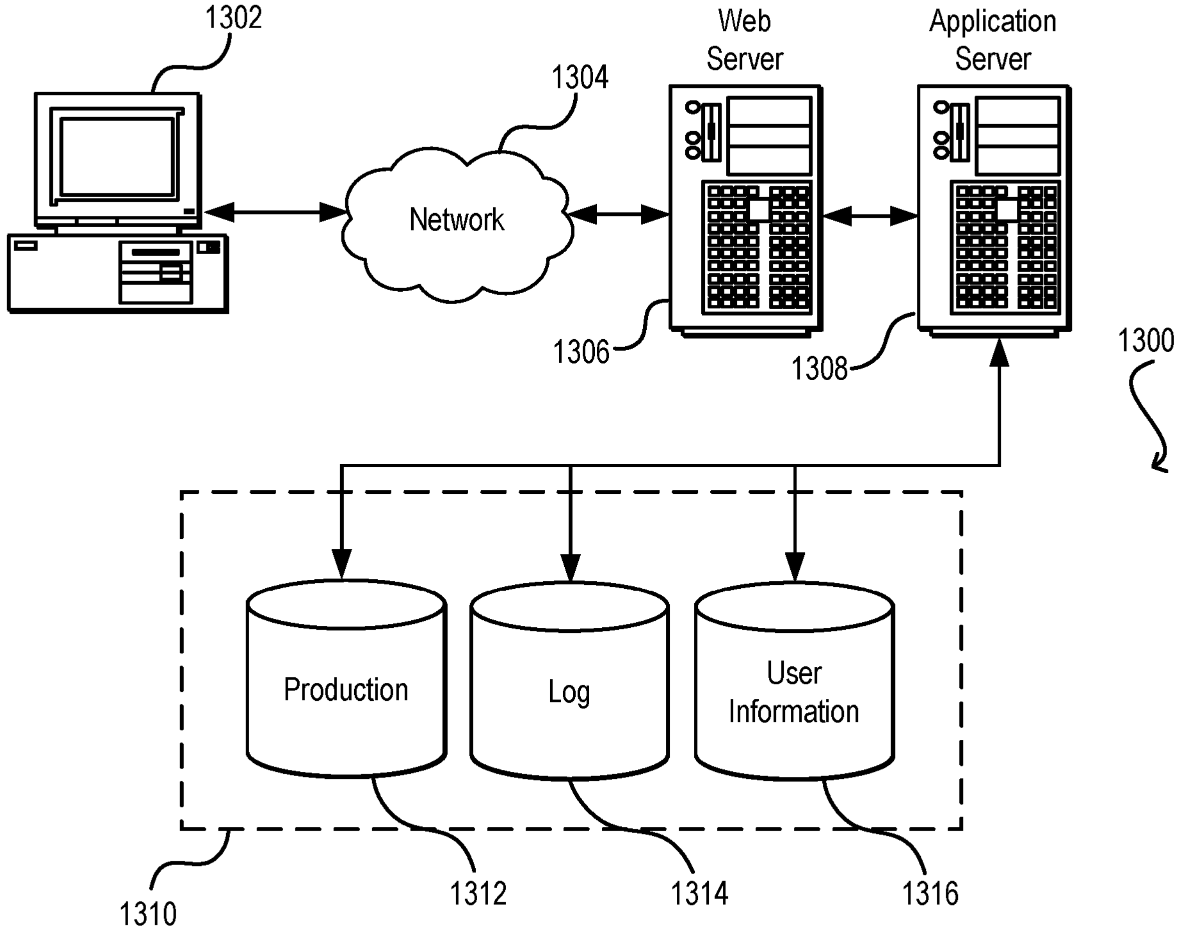
FIG. 13 illustrates an environment in which various embodiments can be implemented.

FIG. 13 illustrates aspects of an example environment 1300 for implementing aspects in accordance with various embodiments. As will be appreciated, although a Web-based environment is used for purposes of explanation, different environments may be used, as appropriate, to implement various embodiments. The environment includes a user device 1302, which can include any appropriate device operable to send and receive requests, messages, or information over an appropriate network 1304 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 1302 and the application server 1308, can be handled by the Web server. It should be understood that the Web and application servers are not required and are merely example components, as structured code discussed herein can be executed on any appropriate device or host machine as discussed elsewhere herein.

The data store 1310 can include several separate data tables, databases or other data storage mechanisms and media for storing data relating to a particular aspect. For example, the data store illustrated includes mechanisms for storing production data 1312 and user information 1316, which can be used to serve content for the production side. The data store also is shown to include a mechanism for storing log data 1314, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Webpage that the user is able to view via a browser on the user device 1302. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of the environment 1300 in FIG. 13 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:

sending, by an application executing at a client device to a server, a request for a webpage, the application being configured to render user interface elements at the client device utilizing client-side rendering techniques;

receiving, from the server, a response comprising first data associated with a server-side rendered widget and second data associated with a portion of the webpage to be rendered by the application, the first data comprising a label that indicates the server-side rendered widget is to be initially hidden from view;

generating, by the application, a document object model corresponding to a first set of components associated with the server-side rendered widget corresponding to the first data;

delaying, by the application, presentation of the server-side rendered widget based at least in part on receiving the label associated with the server-side rendered widget;

generating, by the application, client-side rendered content corresponding to the portion of the webpage to be rendered by the application based at least in part on processing the second data received in the response, wherein processing the second data comprises generating a virtual document object model corresponding to a second set of components associated with the client-side rendered content;

identifying, by the application, a difference between the document object model corresponding to the server-side rendered widget and the virtual document object model corresponding to the client-side rendered content; and in response to identifying the difference between the document object model and the virtual document object model and identifying that the presentation of the server-side rendered widget has been delayed, displaying the webpage at the application, the webpage presenting, at substantially a same time: 1) the server-side rendered widget for which presentation was previously delayed and 2) the client-side rendered content generated by the application.

2. The computer-implemented method of claim 1, wherein the application utilizes a ReactJS JavaScript library.

3. The computer-implemented method of claim 1, wherein the server-side rendered widget comprises one or more user interface elements associated with a second application, wherein the second application comprises a payment application associated with an online retailer website, and wherein subsequent user input is provided to the second application using the one or more user interface elements.

4. The computer-implemented method of claim 1, wherein identifying that the client-side rendered content has been loaded by the application further comprises identifying, by the application, that a particular life-cycle event has been detected.

5. The computer-implemented method of claim 1, wherein the data comprises JavaScript code, and wherein the application processes the data received in the response and associated with the portion of the webpage to be rendered by the application based at least in part on executing the JavaScript code.

6. The computer-implemented method of claim 1, wherein the data comprises a location from which JavaScript code is downloadable, and wherein the application processes the data received in the response based at least in part on:

downloading the JavaScript code from the location; and executing, by the application, the JavaScript code.

7. The computer-implemented method of claim 1, wherein loading the server-side rendered widget corresponding to the data associated with the server-side rendered widget comprises generating a document object model from the data associated with the server-side rendered widget, the document object model comprising a plurality of nodes, each node corresponding to a component to be rendered at the application, the component being defined in the data associated with the server-side rendered widget.

8. The computer-implemented method of claim 1, further comprising:

adding one or more additional nodes to the document object model based at least in part on the difference identified between the document object model and the virtual document object model, wherein adding the one or more additional nodes to the document object model indicates that the client-side rendered content has been loaded by the application, and where presenting the server-side rendered widget and the client-side rendered widget at substantially the same time is further based at least in part on identifying that the additional nodes were added to the document object model.

9. The computer-implemented method of claim 8, wherein adding the one or more additional nodes to the document object model causes the application to generate a life-cycle event, and wherein generating the life-cycle event triggers presentation of the server-side rendered widget for which presentation was previously delayed, causing the server-side rendered widget to be presented at the webpage at substantially the same time as the client-side rendered content.

10. A computing device, comprising:

one or more processors; and.

one or more memories storing computer-executable instructions that, when executed by the one or more processors, cause the compute device to:

receive, from a client application, a request for a webpage;

generate server-side rendered content corresponding to a first portion of the webpage;

obtain data corresponding to a second portion of the webpage that is to be rendered by the client application;

provide, to the client application, a response corresponding to the request, the response comprising the server-side rendered content corresponding to the first portion of the webpage and the data corresponding to the second portion of the webpage, the server-side rendered content being associated with an indicator indicating that the server-side rendered content is to be initially hidden from view, wherein providing the response to the client application, causes the client application to:

generate a document object model corresponding to the first set of components associated with the server-side rendered content;

delay presentation of the server-side rendered content based at least in part on the indicator received with the server-side rendered content;

generate client-side rendered content based at least in part on processing the data corresponding to the second portion of the webpage, wherein processing the data comprises generating a virtual document object model corresponding to a second set of components associated with the client-side rendered content;

identify a difference between the document object model corresponding to the server-side rendered widget and the virtual document object model corresponding to the client-side rendered content; and in response to identifying the difference between the document object model and the virtual document object model and identifying that the presentation of the server-side rendered content has been delayed, present, at the webpage, at substantially a same time, the server-side rendered content that was initially hidden from view and the client-side rendered content.

11. The computing device of claim 10, wherein the data comprises JavaScript or a location from which the JavaScript may be obtained.

12. The computing device of claim 10, wherein the computing device hosts a website that comprises the webpage and an electronic catalog at which one or more items are offered for consumption.

13. The computing device of claim 10, wherein executing the instructions further causes the computing device to encapsulate the server-side rendered content in a wrapper that comprises the indicator that indicates the server-side rendered content is to be hidden from view.

14. A non-transitory computer-readable storage medium comprising one or more memories storing computer-executable instructions that, when executed by one or more processors of a computing device, cause the computing device to:

transmit, to a server, a request for a webpage;

receive, from the server, a response comprising server-side rendered content and executable code corresponding to content to be rendered at the computing device, the server-side rendered content comprising an indicator indicating that the server-side rendered content is to be initially hidden from view;

generate a document object model corresponding to a first set of components associated with the server-side rendered content;

delay presentation of the server-side rendered content based at least in part on receiving the indicator associated with the server-side rendered content;

generating, at the computing device, the content to be rendered at the computing device based at least in part by executing the executable code, wherein generating the content to be rendered at the computing device comprises generating a virtual document object model corresponding to a second set of components associated with the content; and in response to identifying that a difference between the document object model and the virtual document object model and identifying that the presentation of the server-side rendered content has been delayed, presenting, at the webpage, at substantially a same time: 1) the server-side rendered content received in the response, the presentation of which was previously delayed and 2) the content rendered by the computing device.

15. The non-transitory computer-readable storage medium of claim 14, wherein executing the instructions further causes the computing device to hide the server-side rendered content from view.

16. The non-transitory computer-readable storage medium of claim 15, wherein the indicator corresponds to a hidden state.

17. The non-transitory computer-readable storage medium of claim 14, wherein the server-side rendered content is presented with the content rendered at the computing device based at least in part on changing the indicator of the server-side rendered content from a first value corresponding to a hidden state to a second value corresponding to a viewable state.

18. The non-transitory computer-readable storage medium of claim 14, wherein executing the computer-executable instructions further causes the computing device to monitor for one or more events corresponding to one or more respective life-cycle states of mounting the content rendered at the computing device to a document object model, wherein at least one of the one or more events indicates the content rendered at the computing device has been mounted to the document object model.

19. The non-transitory computer-readable storage medium of claim 18, wherein executing the computer-executable instructions further causes the computing device to:

transmit a second request for a second webpage;

receive additional data corresponding to additional content to be rendered at the computing device;

generating the additional content based at least in part on the additional data received in the second request;

loading the additional content into a second document object model;

comparing the second document object model to the document object model to identify a difference between one or more components of the additional content and one or more components of the content; and render, at the computing device, a portion of the additional content corresponding to the difference.

20. The non-transitory computer-readable storage medium of claim 14, wherein the server-side rendered content provides one or more user interface elements of an additional application, and wherein the webpage and the additional application are hosted by a common provider.

* * * * *